United States Patent [19]
Okuda

[11] Patent Number: 5,164,838
[45] Date of Patent: Nov. 17, 1992

[54] TIME BASE ERROR SIGNAL GENERATING APPARATUS

[75] Inventor: Yoshiyuki Okuda, Tokorozawa, Japan

[73] Assignee: Pioneer Electronic Corporation, Tokyo, Japan

[21] Appl. No.: 687,247

[22] Filed: Apr. 18, 1991

[30] Foreign Application Priority Data

Apr. 18, 1990 [JP] Japan ................... 2-102426

[51] Int. Cl.⁵ ............................................. H04N 9/89
[52] U.S. Cl. .................... 358/326; 358/320; 358/337; 360/36.1
[58] Field of Search ............... 358/326, 320, 324, 337, 358/323, 325, 335, 322, 338, 19, 20, 148, 149, 158; 360/36.1, 36.2

[56] References Cited

U.S. PATENT DOCUMENTS

| | | | |
|---|---|---|---|
| 4,313,129 | 1/1982 | Fukui | 358/8 |
| 4,554,582 | 11/1985 | Wine | 358/149 |
| 4,647,984 | 3/1987 | Suzuki et al. | 358/326 |

FOREIGN PATENT DOCUMENTS

| | | |
|---|---|---|
| 3431946A | 3/1985 | Fed. Rep. of Germany . |
| 058581 | 5/1980 | Japan . |
| 2157118A | 9/1985 | United Kingdom . |

Primary Examiner—Tommy P. Chin
Assistant Examiner—Robert Chevalier
Attorney, Agent, or Firm—Fish & Richardson

[57] ABSTRACT

A time base error signal generating apparatus which outputs a phase difference signal representing a phase difference between a horizontal sync signal and a reference signal as a time base error signal. In accordance with the phase status of a vertical sync signal with respect to the reference signal, supply of the horizontal sync signal or reference signal to a phase comparator is inhibited. Therefore, a single, phase comparator can detect the phase difference while avoiding problems such as a phase offset.

2 Claims, 6 Drawing Sheets

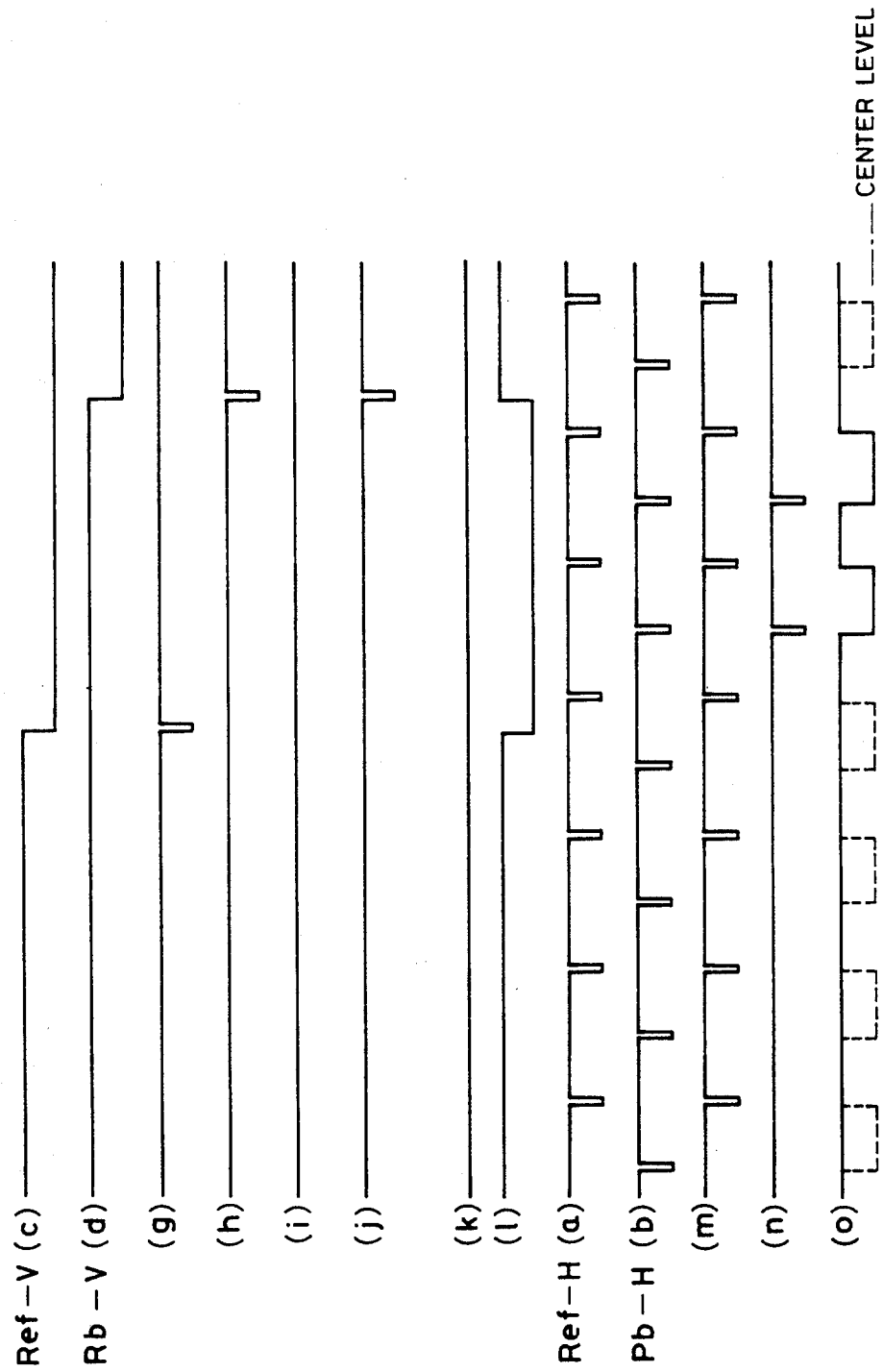

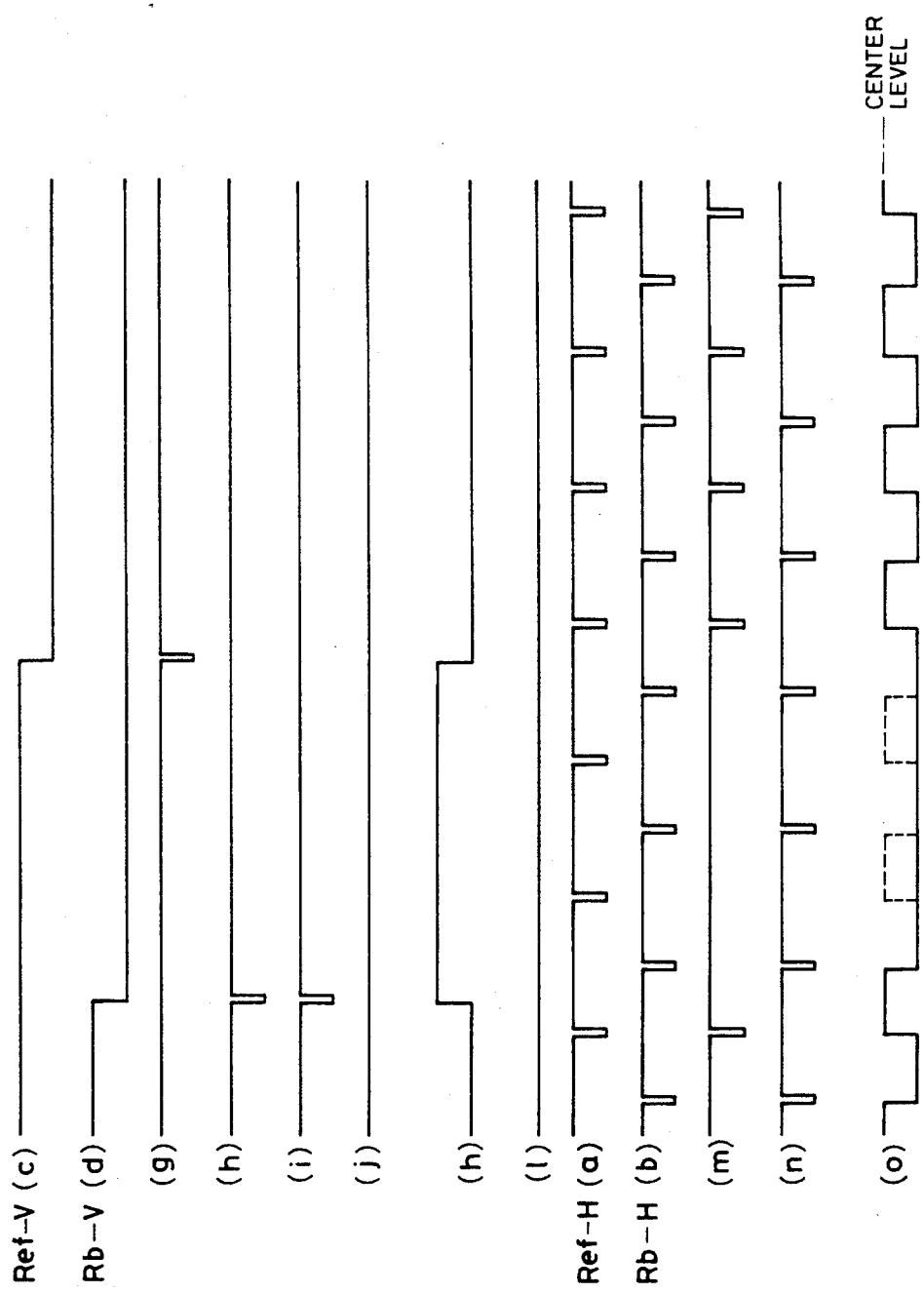

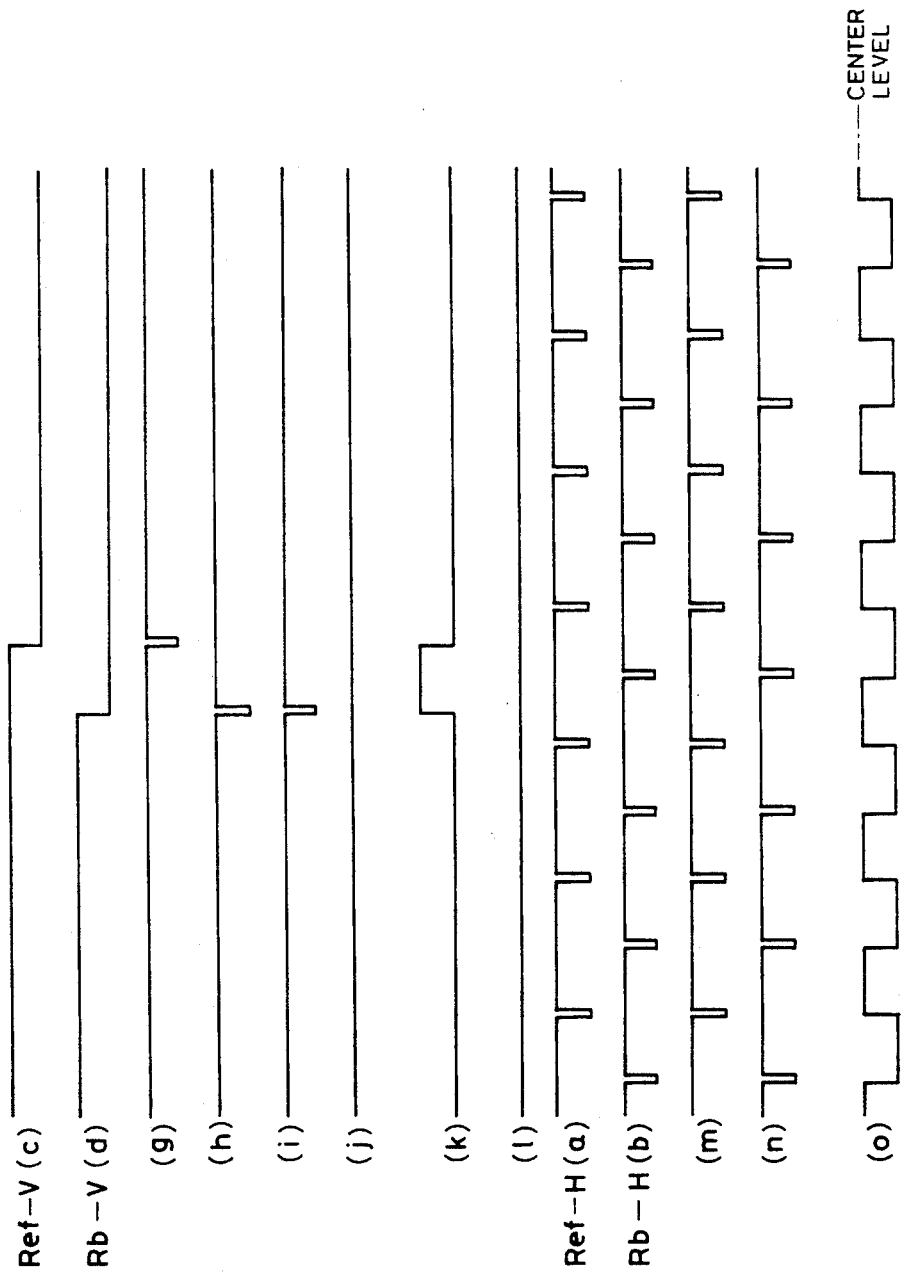

TIME BASE ERROR SIGNAL GENERATING APPARATUS

BACKGROUND OF THE INVENTION

1. Field of the Invention

The present invention relates to a time base error signal generating apparatus for use in an image reproducing apparatus, such as a video disk player or a VCR.

2. Description of Background Information

An image reproducing apparatus, such as a video disk player or a VCR, is so designed as to insert a vertical sync signal and a horizontal sync signal, for example, as sync signals in a video signal, extract both the sync signals from the video signal, and synchronize the sync signals with a reference sync signal to thereby perform coarse and fine adjustments of the time base to read and reproduce video information from a recording medium. Such a sync reproduction requires detection of a time base error of the reproduced video signal with respect to the reference sync signal. FIG. 1 exemplifies a conventional apparatus for detecting this time base error and generating a time base error signal according to the detected error.

Referring to FIG. 1, a phase detector 101 detects the phase difference between a playback vertical reference sync signal Pb-V extracted from a reproduced video signal and a reference vertical sync signal Ref-V, and a phase detector 102 detects the phase difference between a playback horizontal sync signal Pb-H obtained from the reproduced video signal and a reference horizontal sync signal Ref-H. Phase error signals from these phase detectors 101 and 102 are respectively multiplied by appropriate coefficients $k_1$ and $k_2$. The multiplied signals are added by an adder 103, and the resultant signal is derived as a time base error signal. According to the thus designed conventional apparatus, an error component generated from the vertical sync signal whose detection accuracy is coarser than that of the horizontal sync signal is dominant, and the phase offset of the vertical sync signal or lower accuracy in detecting the phase difference will influence the accuracy in synchronization. This will disturb the synchronization which is executed at higher accuracy based on the horizontal sync signal. To overcome this shortcoming, the offset between the phase detectors should be adjusted, so that the circuit structure will become complicated.

OBJECT AND SUMMARY OF THE INVENTION

It is therefore an object of the present invention to provide a time base error signal generating apparatus which can permit a single phase comparator to detect a phase difference between a pair of sync signals to thereby overcome problems such as a phase offset.

To achieve this object, according to the present invention, there is provided a time base error signal generating apparatus for detecting an error of a time base of a reproduced video signal containing a first playback sync signal of a predetermined period and a second playback sync signal of a longer period than the predetermined period and generating a time base error signal, which apparatus comprises a phase comparing means for detecting a phase difference between the first playback sync signal and a first reference sync signal; a detecting means for detecting a status of the phase of the second playback sync signal with respect to a second reference sync signal, and generating a first control signal, in case of an advanced phase, for a period according to the degree of the advancement, and generating a second control signal, in case of a delayed phase, for a period according to the degree of the delay; and a gate means for inhibiting supply of the first reference sync signal to the phase comparing means in response to the first control signal for a duration thereof, and inhibiting supply of the first playback sync signal to the phase comparing means in response to the second control signal for a duration thereof, whereby the phase difference signal from the phase comparing means is derived a the time base error signal.

According to the time base error signal generating apparatus of the present invention, the phase difference between the first reference sync signal and the first playback sync signal is detected to output a phase difference signal representing this phase difference as a time base error signal, the phase status of the second playback sync signal having a longer period than the first playback sync signal is detected with respect to the second reference sync signal, supply of the first reference sync signal to the phase comparing means is inhibited, in case of an advanced phase, for a period according to the degree of the advancement, and supply of the first playback sync signal to the phase comparing means is inhibited, in case of a delayed phase, for a period according to the degree of the delay.

BRIEF DESCRIPTION OF THE DRAWINGS

FIGS. 8 to 10 are diagrams illustrating waveforms at various points in cases of delayed phase, advanced phase, and matched phase of a playback vertical sync signal Pb-V(d) to a reference vertical sync signal Ref-V(c).

DETAILED DESCRIPTION OF THE PREFERRED EMBODIMENT

A preferred embodiment of the present invention will now be described in detail, referring to the accompanying drawings.

Figure 1:
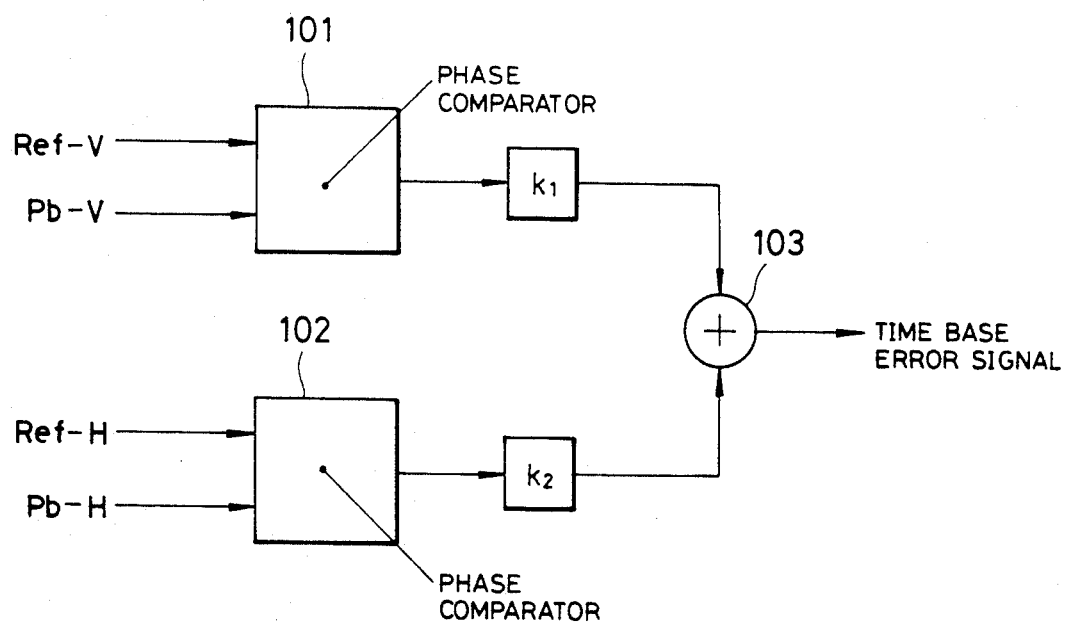
FIG. 1 is block diagram illustrating an example of a conventional time base error signal generating apparatus.
Figure 2:
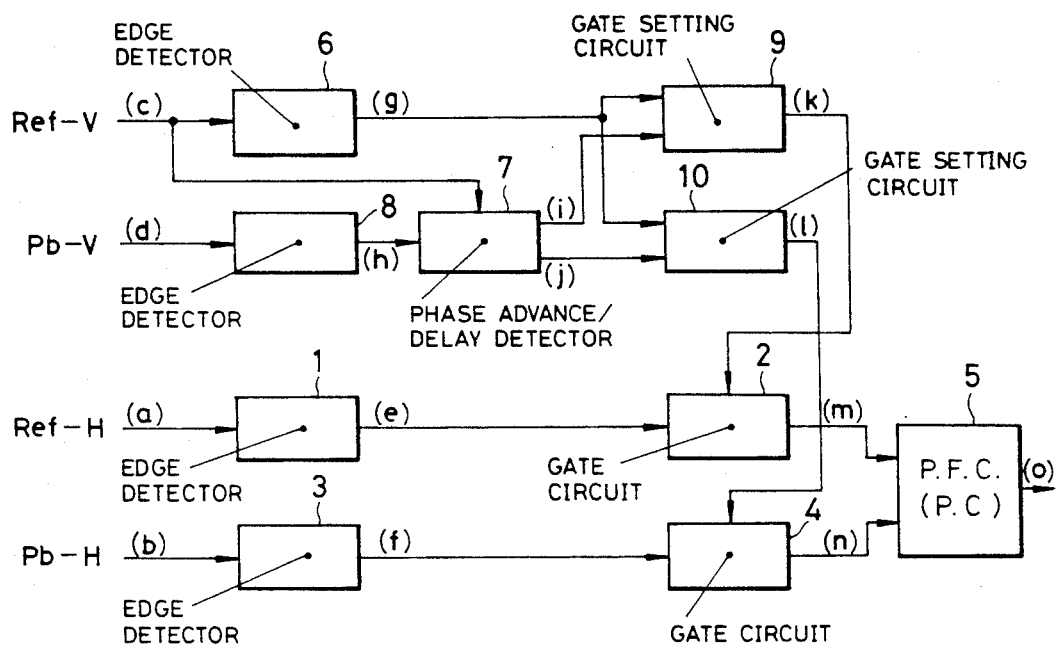
FIG. 2 is a block diagram illustrating an embodiment of the present invention.
Figure 3:
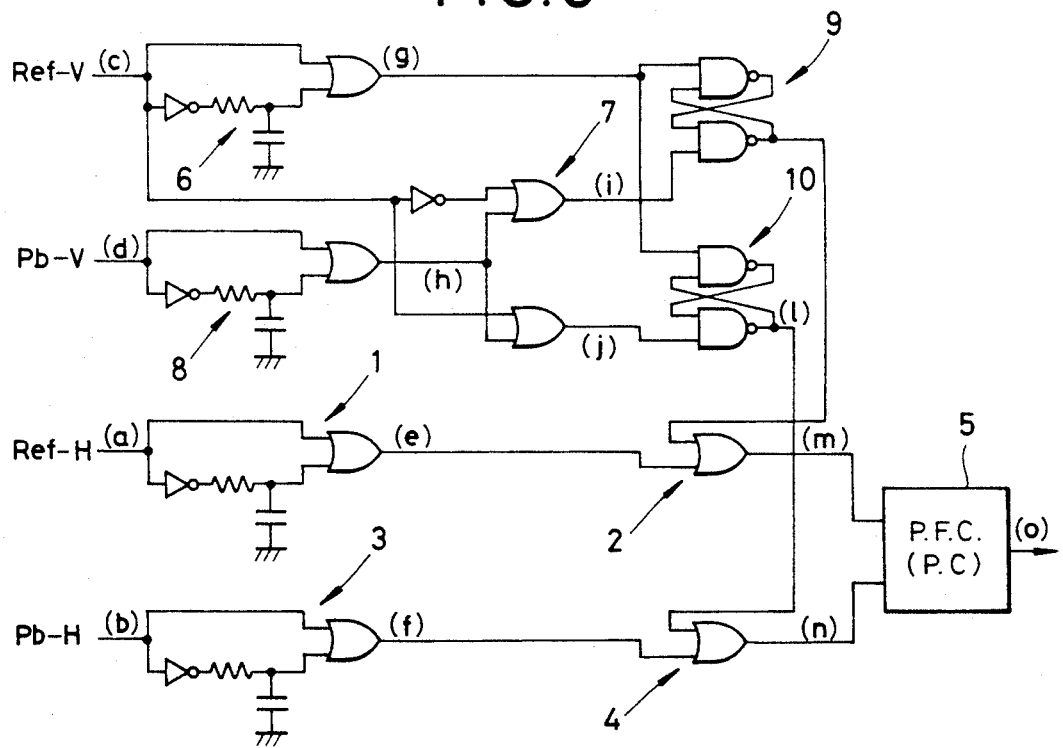
FIG. 3 is a block diagram illustrating a specific example of the apparatus shown in FIG. 2.

FIG. 2 is a block diagram illustrating an embodiment of the present invention, and FIG. 3 is also a block diagram illustrating a more specific example of the apparatus shown in FIG. 2. In FIGS. 2 and 3, a reference horizontal sync signal Ref-H(a), for example, is supplied as a first reference sync signal through an edge detector 1 to a gate circuit 2. A playback horizontal sync signal Pb-H(b), for example, which is extracted from a reproduced video signal, is also supplied as a first playback sync signal through an edge detector 3 to a gate circuit 4. The edge detectors 1 and 3 serve to prevent the sync signal pulse from leading from the gate circuits 2 and 4 due to the pulse width, when the gate circuits 2 and 4 are closed, by narrowing the width of the sync signal pulse.

Figure 4:
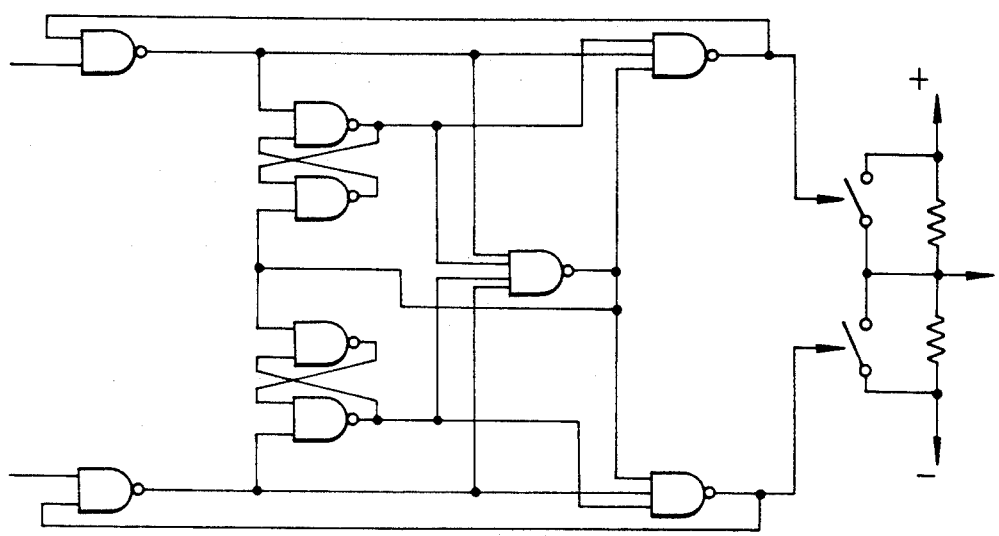
FIG. 4 is a block diagram exemplifying the structure of a phase frequency comparator.
Figure 5:
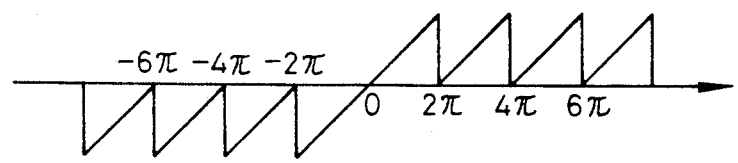
FIG. 5 is a diagram showing the phase comparing characteristic of the phase frequency comparator shown in FIG. 4.
Figure 6:
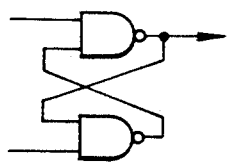
FIG. 6 is a block diagram exemplifying the structure of a phase comparator.
Figure 7:
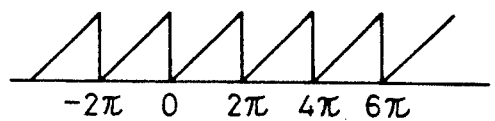
FIG. 7 is a diagram representing the phase comparing characteristic of the phase comparator shown in FIG. 6.

The reference horizontal sync signal Ref-H(e) and the playback horizontal sync signal Pb-H(f), after passing through the gate circuits, are supplied to a phase frequency comparator (or a phase comparator) 5. The phase frequency comparator (or the phase comparator) 5 detects the phase difference between two input signals (m) and (n), and issues a phase difference signal as a time base error signal (o). The phase frequency comparator (or the phase comparator ) 5 used here has a well known circuit structure as shown in FIG. 4 or 6, but is not limited to such circuit constitution. The phase comparing characteristics of the phase frequency comparator in FIG. 4 and the phase comparator in FIG. 6 are indicated in FIGS. 5 and 7, respectively.

A reference vertical sync signal Ref-V(c), for example, is supplied in turn as the second reference sync signal to an edge detector 6 and a phase advance/delay detector 7. Then, a playback vertical sync signal Pb-V(d) acquired from the reproduced video signal, for example, is sent as the second playback sync signal through the edge detector 8 also to the phase advance/-delay detector 7. The reference vertical sync signal Ref-V(g) through the edge detector 6 is sent as one input to gate setting circuits 9 and 10, both of a flipflop type. The phase advance/delay detector 7 detects whether the phase of the playback vertical sync signal Pb-V is advanced or delayed to the reference vertical sync signal Ref-V and sends the playback vertical sync signal Pb-V(h) from the edge detector 8 as the other input (j) to the gate setting circuit 10 for the advanced phase and as the other input (i) to the gate setting circuit 9 for the delayed phase.

The edge detectors 6 and 8 are provided to prevent the gate setting circuits or flip-flops 9 and 10 from becoming unstable by simultaneous inputs.

When the phase of the playback vertical sync signal Pb-V(d) is advanced to the reference vertical sync signal Ref-V(c), the gate setting circuit 9 generates a gate control signal (k) in a period corresponding to the phase advance. When the phase of the signal Pb-V(d) is delayed to the signal Ref-V(c), the gate setting circuit 10 generates a gate control signal (l) in a period corresponding to the phase delay. These gate control signals (k) and (l) are fed to the gate circuits 2 and 4 and function to inhibit, as long as they exist, the supply of a reference horizontal sync signal Ref-H(e) and a playback horizontal sync signal Pb-H(f) to the phase frequency comparator 5.

FIGS. 8 to 10 illustrate waveforms in the respective sections when the phase of the playback vertical sync signal Pb-V(d) is delayed, advanced, and matched (the phase difference between Ref-(c) and Pb-V(d) being within ½ (H) to the reference vertical sync signal Ref-V(c). In FIGS. 8 and 9, the portions of the time base error signal (o) indicated by doted-lines, that is, the comparison output from the phase frequency comparator 5, represent the result of the phase comparison only between the reference horizontal sync signal Ref-H(e) and the playback horizontal sync signal Pb-H(f). The gap between the doted-line portions and solid-line portions of the signal (o) is the offset of the comparison output (o) of the comparator 5, caused by the phase difference between Ref-V(c) and Pb-V(d). It is apparent in FIG. 9 that the phase difference between Ref-V(c) and Pb-V(d) does not cause the offset of the comparison output (o) in the case of matched phase.

Thus, the phase difference between the reference horizontal sync signal Ref-H(e) and the playback horizontal sync signal Pb-H(f) is detected by the phase frequency comparator 5, the phase difference signal representing this phase difference is output as a time base error signal (o), and the phase status of the playback vertical sync signal Pb-V(d) to the reference vertical sync signal Ref-V(c) is detected. When the phase is in an advanced state, supply of the reference horizontal sync signal Ref-H(e) to the phase frequency comparator 5 is inhibited for a period according to the degree of the advancement. When the phase is in a delayed state, supply of the playback horizontal sync signal Pb-H(f) to the phase frequency comparator 5 is inhibited for a period according to the degree of the delay. When the vertical synchronization is effected, therefore, it appears that only a horizontal synchronization loop exists. The synchronization will not therefore be affected by an offset originating from the phase difference between the reference vertical sync signal Ref-V(c) and the playback vertical sync signal Pb-V(d).

In the case of a synchronizing system which performs phase comparison in accordance with only the horizontal (H) sync signal, when a pseudo horizontal sync signal is generated by noise, a so-called cycle slip may occur at an H rate which deviates synchronization by 1H. If such a cycle slip occurs, however, the present system detects the event as a deviation in vertical synchronization and functions to counterbalance the deviation. As a result, no cycle slip occurs.

The above-described time base error signal generating apparatus according to the present invention is for use in a spindle servo for a video disk player, a drum servo for a VCR, particularly, a system that synchronizes with external reference horizontal sync signal and reference vertical sync signal, and a system that needs vertical synchronization because of a frame memory concurrently provided in a PLL circuit to follow up the write clock of a digital time base compensating apparatus, which compensates for the time base of a signal containing a jitter of a video system.

The foregoing description has been given with reference to the combined use of a horizontal sync signal as the first sync signal of a predetermined period and a vertical sync signal as the second sync signal having a period longer than the predetermined period. However, the present invention is not restricted to this particular combination. For instance, a vertical sync signal serving as the first sync signal and a color burst signal as the second sync signal may possible be combined.

As described above, the time base error signal generating apparatus of the present invention is designed such that the phase difference between the first reference sync signal and the first playback sync signal is detected to output a phase difference signal representing this phase difference as a time base error signal, the phase status of the second playback sync signal having a longer period than the first playback sync signal is detected with respect to the second reference sync signal, supply of the first reference sync signal to the phase comparing means is inhibited, in case of an advanced phase, for a period according to the degree of the advancement, and supply of the first playback sync signal to the phase comparing means is inhibited, in case of a delayed phase, for a period according to the degree of the delay. This arrangement can permit a single, phase comparator to detect the phase difference between both the sync signals and can therefore overcome problems such as a phase offset or the like inherent in the conventional apparatus.

What is claimed is:

1. A time base error signal generating apparatus for detecting an error of a time base of a reproduced video signal containing a first playback sync signal of a predetermined period and a second playback sync signal of a longer period than the predetermined period and generating a time base error signal, the apparatus comprising:

phase comparing means for detecting a phase difference between the first playback sync signal and a first reference sync signal;

detecting means for detecting a status of the phase of the second playback sync signal with respect to a second reference sync signal, and generating a first control signal, in case of an advanced phase, for a period according to the degree of the advancement, and generating a second control signal, in case of a delayed phase, for a period according to the degree of the delay; and gate means for inhibiting supply of the first reference sync signal to the phase comparing means in response to the first control signal for a duration thereof, and inhibiting supply of the first playback sync signal to the phase comparing means in response to the second control signal for a duration thereof, whereby the phase difference signal from the phase comparing means is output as the time base error signal.

2. A time base error signal generating apparatus according to claim 1, wherein the first playback sync signal is a horizontal sync signal or a color burst signal, and the second playback sync signal is vertical sync signal or horizontal sync signal.

* * * * *